Dec. 10, 1963    P. W. STUMP    3,113,714
CONTAINER
Filed March 5, 1962

INVENTOR.
PAUL W. STUMP
BY *Watts and Fisher*

ATTORNEY

United States Patent Office 3,113,714
Patented Dec. 10, 1963

3,113,714
CONTAINER
Paul W. Stump, North Olmsted, Ohio, assignor to The Cleveland Container Company, a corporation of Ohio
Filed Mar. 5, 1962, Ser. No. 177,419
8 Claims. (Cl. 229—51)

This invention relates to fiber containers, and more particularly to a container which is easily opened.

In the past one difficulty encountered in the use of fiber containers has been that of opening them. When the material carried by the container is a liquid of granular there is of course little difficulty involved because a cover equipped with a pouring spout will accommodate the dispensing of the material. With solids, however, a problem of removal of the material has existed. This is especially true if the walls of the container include metal foil or plastic films added for moisture resistance, wall strength or other reasons. The present invention has solved this problem.

When a tubular container is equipped with an outer label ply of relatively high tensile strength, such as metal foil, it is very difficult to burst or otherwise fracture the wall of the container. If the label ply is removed, on the other hand, bursting of the container wall becomes relatively simple. Further, it is possible to construct the wall of a fiber container such that once the label ply is removed the wall is easily ruptured as by twisting the container, and such a container can be built without sacrifice of wall strength in the complete container. This invention, then is directed to this class of container in which the label ply is removed to facilitate opening of the container.

With the container of this invention the label ply is wound and bonded to the ply immediately beneath it. Near one end of the label ply a pull tab is bonded to the underside of the ply and allowed to project slightly from the seam. The label ply is tightly wound and bonded to the ply beneath it to give strength to the container especially against bursting forces. Through the use of a relatively weak adhesive, or preferably a paper which can be readily fractured, provision is made for readily tearing the label ply, in a single piece, from the remainder of the tube. This tearing is accomplished whenever the tab is grasped and pulled.

In the past attempts have been made to accomplish this same objective, but all have had serious shortcomings. One proposal has been to use a band similar to that used on cigarette packages which when pulled is intended to sever a ring around the container and thus facilitate opening of the container. Obviously this system limits the usable materials to those having relatively low tear strength thus limiting the strength of the container. Further, even after the band is pulled successively, opening of the container is often still difficult.

Another proposal has been to leave a spiral portion of the label ply unglued. A skiving cut is made adjacent one corner to bend the corner of the label ply upwardly to serve as a starting point for tearing off the label ply. In addition to obviously leaving a weakness in the wall of the container this also has the disadvantage of poor durability during handling prior to opening of the container. There is also a tendency for the handling of the container to cause premature removal of the label. Further, the projecting corner which is weakened along the skive, may become further weakened from handling and be broken away before an attempt is made to tear away the label.

With the present invention a relatively stiff tab may be employed which rests against the label ply resisting the tendency to become worn from handling. In addition the label ply is tightly wound on the ply immediately beneath it and bonded to it over the entire interface therebetween. This not only provides maximum wall strength but also assists in maintaining the tab flat against the surface of the label ply.

Accordingly, an object of this invention is to provide a container having a decorative label ply which may be facilely and completely removed.

Another object of this invention is to provide a container which is easy to open and does not foul in a half-opened position.

A further object of the invention is to provide a container with a frangibly connected decorative label which is facilely removable by pulling a connected pull tab.

Other objects and a fuller understanding of the invention may be had by referring to the following description and claims taken in conjunction with the accompanying drawings in which:

Figure 1:
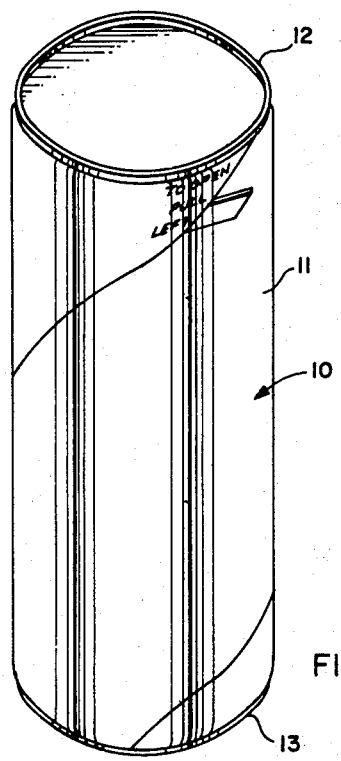
FIGURE 1 is a perspective view of the container of the invention.

Referring now to the drawing which shows the preferred embodiment of the invention, a container is generally indicated by the reference character 10. The container 10 comprises a central tube 11 which is surrounded by a decorative label ply 25 and suitable end closures 12, 13.

The disclosed central tube is one which is especially designed for ready opening once the label ply 25 is removed. While, as will become apparent other tubes are suitable for use with this invention the disclosed tube is preferred and accordingly will be described with some detail.

The central tube 11 has three plies. The three plies are shown in an exploded relative arrangement to facilitate disclosure of the container construction. Each of the plies is spirally wound. The adjacent margins or edges of two of the plies define helical seams extending from one end of the tube to the other. As the seams constitute the weakened portion of their respective plies they are circumferentially separated so as not to overlie one another. Disposed in this manner the seams do not greatly affect the hoop strength of the container.

The innermost ply forms an inner liner 14 for the tube 11. This liner may be metal foil with a kraft paper backing 15. The inner liner 14 is spirally wound with its edges in an overlapping relation and an adhesive 16 is applied between the overlapping edges.

An outer ply has a chip board layer 17 lined with newspaper stock 18 on one side and kraft paper 19 on the other side. The newspaper stock 18, or "news liner" as it is more commonly called, may be .007 inch thick. A combined thickness of the news liner 18, chip board 17 and kraft paper 19 of .32 inch has been found satisfactory for containers.

The outer ply 17 is spirally wound around the inner liner 14 so that the kraft paper backing 15 is adjacent to the kraft paper liner 10. An adhesive 20 bonds the kraft paper backing 15 to the kraft paper liner 19. The adhesive 20 is of a water emulsion, resinous type.

The chip board layer 17 provides rigidity to the tube 11 and is essentially the supporting structure of the container wall. The edges 22, 23 of the outer ply are substantially in an abutting relation and define a helical seam extending circumferentially from one end of the tube to the other. The inner liner 14 and a thin strip of parchment paper 24, which is described below, serve to maintain the edges 22, 23 in their abutting relation.

Figure 2:
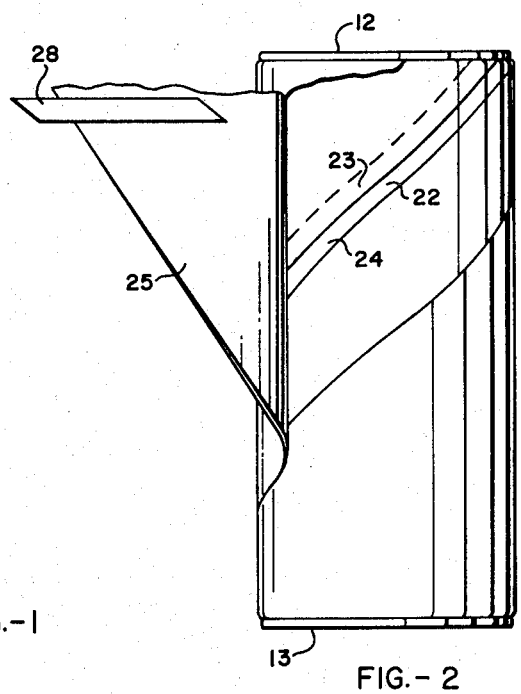
FIGURE 2 is an elevational view of the container of the invention showing the outer label ply partially removed; and, FIGURE 3 is an exaggerated but foreshortened view, in section, of the wall of a typical container employing this invention.
Figure 3:
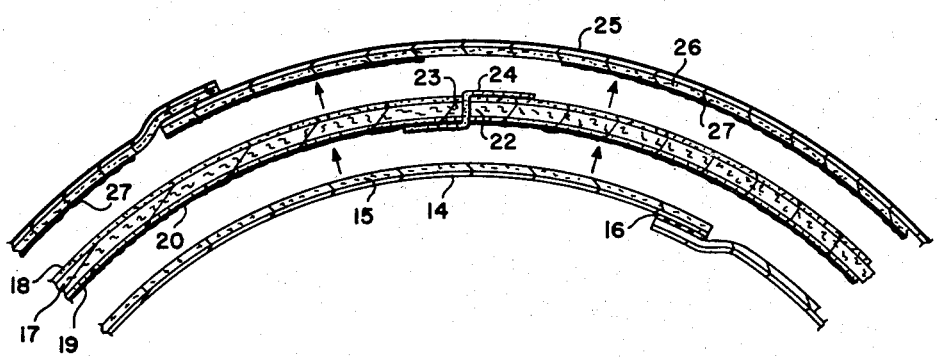

The walls of the tube 11 are strengthened by applying the thin strip of parchment paper 24 along the helical seam to bond edges 22, 23 together. Thus, the thin strip of parchment paper is effectively the third ply although it is not a complete ply. As shown in FIGURES 2 and 3, a strip of parchment paper 24 is positioned between the abutting edges 22, 23. The parchment paper 24 is bent over in one direction and glued to the top side of edge 22 and bent in the other direction and glued to the underside of edge 23.

Parchment paper is used for the paper strip 24 because parchment paper snaps easily and breaks off cleanly under pressure. Parchment paper is also grease-proof. A 40 pound weight parchment paper has been found to be satisfactory for strengthening the container and to provide adequate winding strength.

The decorative label ply 25 is provided to decorate and strengthen the container. The label ply 25 is spirally wound around the outer ply to cover it.

An adhesive 27 of the water emulsion, resinous type but having a low solid content adheres kraft paper backing 26 of the label ply 25 to the news liner 18. Using a low solid content adhesive provides a frangible connection of the label ply to the container so it may be easily peeled off. As the news liner 18 is softer than the kraft paper backing 26 it tears easily further facilitating the removal of the outer label ply 25.

When the container is opened for removal of its contents the outer label ply 25 is first removed. According to this invention this removal of the label ply is readily accomplished through the provision of a short pull tab 28. See FIGURE 2.

The pull tab is adhesively secured to the underside of the outer label ply. It is circumferentially positioned on the tube 11 near the top end enclosure 12. The pull tab 28 projects a short distance out from under the outer label ply 25 so that it can be easily grasped between the fingers. A rayon cellulose tape has been found very satisfactory as a material for the pull tab 28.

To open the container one grasps the pull tab 28 and pulls it back tearing the decorative label 25 away from the end enclosure 12. Once started in this manner the label itself is easily grasped and removed. Removing the outer label exposes the helical seam formed by the abutting edges 22, 23. This seam can be easily fractured.

During manufacture, as the decorative label ply 25 is spirally wound around the tube 11 short strips of pull tab 28 are periodically positioned on the underside of the outer label ply 25. The pull tab 28 extends circumferentially along the tube and projects a short distance out from under the label ply 25. While the tab is present and easily grasped, the label is nonetheless lightly wound and firmly adhered to the tube to give a smooth appearance and a strong container. Even though strong, the container is as has been described, easily opened.

While the invention has been described in detail it is believed to comprise essentially a container having a central tube portion which requires removal of the label ply in order to be facilely opened, the label ply decorating the tube and being wound therearound and a short pull tab secured to the label ply and projecting a short distance beyond the edge of the label ply to be easily grasped between the fingers.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A container comprising:
   (a) an inner ply of semi-rigid material wound to provide a container tube;
   (b) an outer label ply tightly wound around the inner ply and having edges defining a seam;
   (c) frangible means bonding said label ply to said inner ply over substantially the entire interface therebetween;
   (d) a pull tab having a portion bonded to the underside of the label ply near one end of the tube and another portion extending through the seam and overlying a portion of the outer surface of the label ply;
   (e) end enclosures secured to the ends of the tube to complete the container; and,
   (f) said frangible means having a separation strength less than the tear strength of the label ply at the pull tab whereby pulling the tab back on the seam separates the frangible means and tears the label ply at the near end enclosure and not at the pull tab.

2. The combination of claim 1 wherein said label ply is spirally wound.

3. The combination of claim 1 wherein the bonded portion of the pull tab extends circumferentially of the tube to the extent necessary to provide an adequate bond to the label ply.

4. A container comprising:
   (a) an inner ply of relatively rigid material wound to provide a container tube;
   (b) an outer label ply of relatively flexible material spirally wound around said inner ply, said label ply having edges defining a helical seam extending from one end of the tube to the other;
   (c) said label ply being continuous and unbroken throughout its entire extent;
   (d) a pull tab having a first portion bonded to the underside of the label ply near one end of the tube and a second portion extending through the helical seam and overlying a portion of the outer surface of the label ply;
   (e) the first portion of said pull tab extending circumferentially of the tube and having a length substantially less than the circumferential dimension of the label ply at the location of the pull tab, the second portion extending beyond the seam so as to be easily grasped by the fingers before the label ply has been torn; and,
   (f) end enclosures secured to the ends of the tube to complete the container, whereby said pull tab is easily grasped by the fingers and pulled back against the seam to tear the label from the near end enclosure to start removal of the label ply which may be completed by grasping the label ply itself and pulling it from the tube.

5. The combination of claim 4 including:
   (g) frangible means bonding said label ply to said inner ply over substantially the entire interface therebetween; and,
   (h) said frangible means having a separation strength less than the tear strength of the label ply at the pull tab whereby pulling the tab back on the seam separates the frangible means and tears the label ply at the near end enclosure and not at the pull tab.

6. The combination of claim 5 wherein said frangible means includes a soft paper liner on the inner face of one of said plies which liner is adhesively secured to the other of said plies.

7. The combination of claim 5 wherein said frangible means includes a kraft paper liner on the face of one of said plies and a soft news liner on the face of the other of said plies and an adhesive securing said liners together.

8. A container comprising:
   (a) a liner ply being wound to form a tube;
   (b) an inner ply of a relatively rigid material spirally wound around said liner ply with the edges of the inner ply in an abutting relation;

(c) said inner ply including a soft news liner on its entire outer surface;

(d) a decorative label ply having a kraft paper backing and being spirally wound around said inner ply with the kraft paper adjacent said news liner, the edges of said label ply defining a helical seam extending from one end of the tube to the other;

(e) said label ply being continuous and unbroken throughout its entire extent;

(f) an adhesive bonding said kraft paper liner to said news liner throughout their entire contiguous extent except for portions immediately adjacent the abutting edges of the inner ply;

(g) a pull tab having a first portion bonded to the underside of the label ply in the proximity of one end of the tube and a second portion extending through the helical seam and overlying a portion of the outer surface of the label ply, the first portion of said pull tab extending circumferentially of the tube and having a length substantially less than the circumferential dimension of the label ply at the location of the pull tab, and the second portion extending beyond the seam so as to be easily grasped by the fingers before the label ply has been torn; and, (h) end enclosure secured to the ends of the tube to complete the container, whereby removal of substantially the entire label ply is started by pulling the pull tab back on the seam so as to tear the label ply/from the near end enclosure and removal is completed by peeling said label ply from said outer ply so as to effect a separation in at least one of the liners.

References Cited in the file of this patent

UNITED STATES PATENTS

| | | |
|---|---|---|
| 2,793,127 | Geist et al. | May 21, 1957 |
| 2,811,455 | Erekson | Oct. 29, 1957 |
| 3,021,047 | Pottle et al. | Feb. 13, 1962 |
| 3,030,001 | Stump | Apr. 17, 1962 |